(12) United States Patent
Schmid et al.

(10) Patent No.: US 8,177,887 B2
(45) Date of Patent: May 15, 2012

(54) AEROSOL PARTICLE COLLECTION

(75) Inventors: Geoffrey Schmid, San Diego, CA (US); Kira N. Ellsaesser, San Diego, CA (US); Henric Larsson, Oceanside, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 310 days.

(21) Appl. No.: 12/714,455

(22) Filed: Feb. 27, 2010

(65) Prior Publication Data

US 2011/0209616 A1   Sep. 1, 2011

(51) Int. Cl.
*B01D 45/00* (2006.01)

(52) U.S. Cl. ............... 95/272; 95/273; 95/268; 55/320; 55/315; 55/434; 55/462; 55/465; 55/442; 55/463; 55/464; 347/36

(58) Field of Classification Search .............. 55/320, 55/315, 434, 462–465, 442; 95/272, 273, 95/268; 347/36
See application file for complete search history.

(56) References Cited

U.S. PATENT DOCUMENTS

| | | | |
|---|---|---|---|
| 3,570,221 A * | 3/1971 | Oliver ........................ 55/418 |
| 4,288,235 A * | 9/1981 | Gartside et al. ............. 55/434.1 |
| 4,348,364 A * | 9/1982 | Gartside et al. ............. 422/214 |
| 4,433,984 A * | 2/1984 | Gartside et al. ............. 96/144 |
| 4,556,541 A * | 12/1985 | Gartside et al. ............. 422/145 |
| 5,167,795 A * | 12/1992 | Gartside ...................... 208/67 |
| 5,391,289 A * | 2/1995 | Forde et al. ................. 208/113 |
| 5,912,368 A * | 6/1999 | Satarino et al. .............. 55/320 |
| 6,328,491 B1 * | 12/2001 | Beehler et al. ............. 400/648 |
| 6,482,312 B1 * | 11/2002 | Gartside et al. ............. 208/113 |
| 6,565,189 B2 | 5/2003 | Yamada et al. |
| 7,981,182 B2 * | 7/2011 | Volchko ...................... 55/462 |
| 2003/0150198 A1 * | 8/2003 | Illingworth et al. .......... 55/406 |
| 2009/0166286 A1 * | 7/2009 | Volchko ...................... 210/455 |

* cited by examiner

*Primary Examiner* — Jason M. Greene
*Assistant Examiner* — Dung H Bui

(57) ABSTRACT

In one embodiment, an aerosol particle collector includes a duct defining a flow path configured to remove larger particles from aerosol flowing through the duct and to store the removed particles in the duct while maintaining a uniform rate of aerosol flow throughout a predetermined useful life of the duct even as stored aerosol particles accumulate in the duct. In another embodiment, an aerosol particle collector includes a duct and a plurality of baffles in the duct. The duct has an elongated inlet extending along a length of the duct and an outlet located at one end of the length of the duct. A first one of the baffles extends along a first side of the duct for deflecting incoming aerosol toward a second side of the duct opposite the first side. A second one of the baffles is for deflecting aerosol toward the outlet.

14 Claims, 13 Drawing Sheets

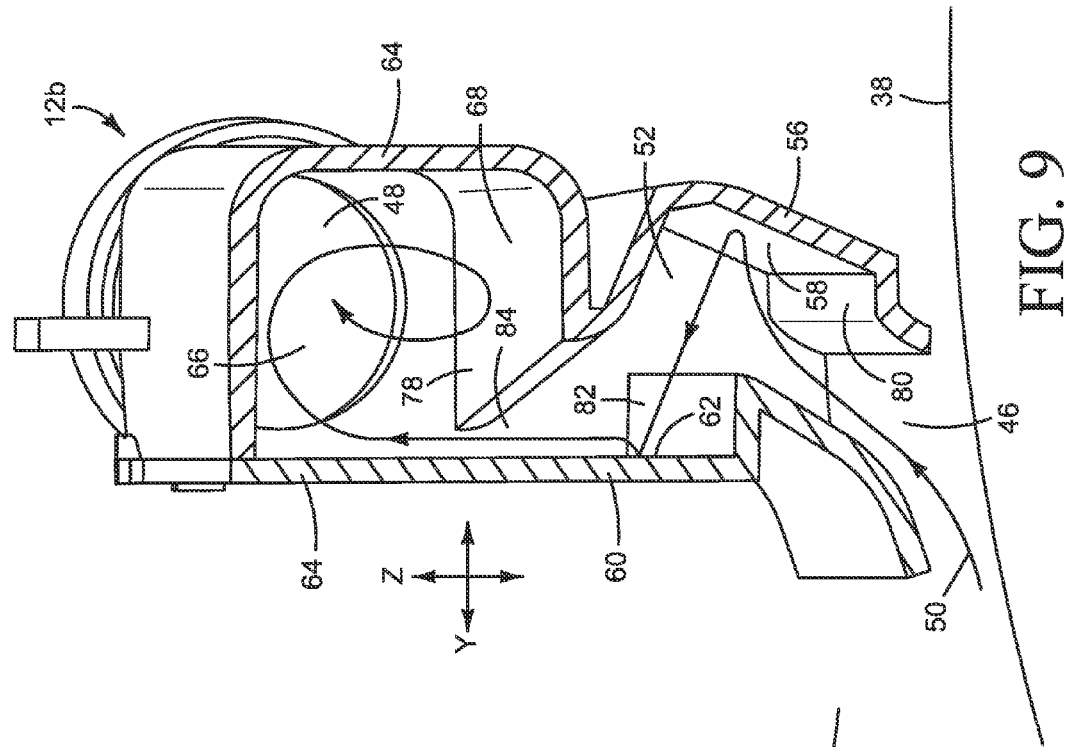
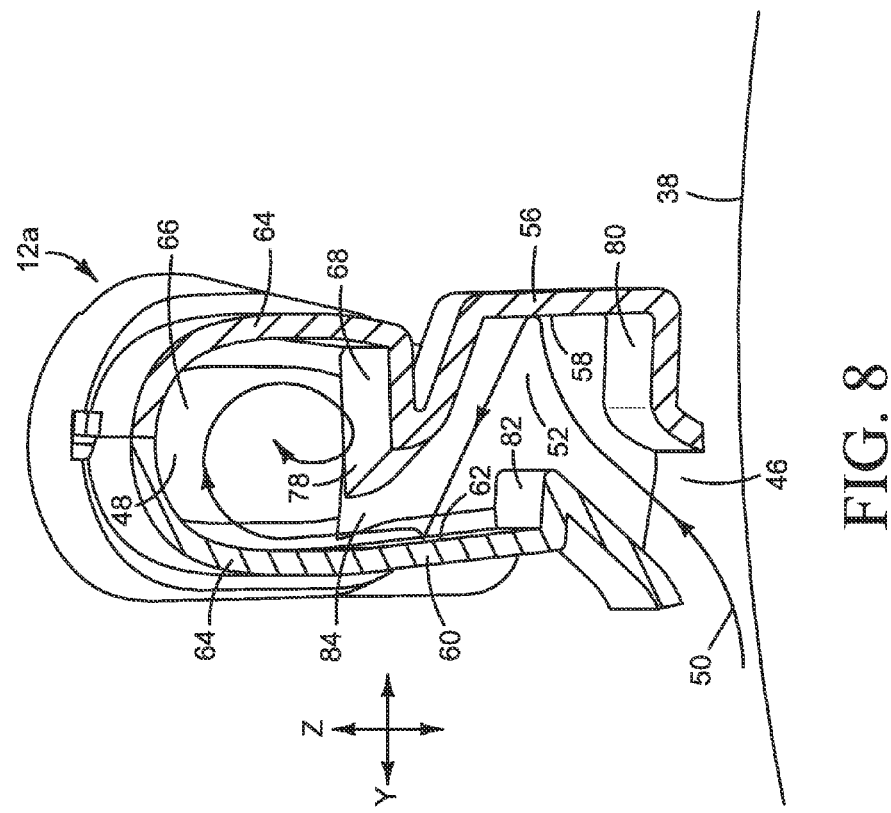

AEROSOL PARTICLE COLLECTION

BACKGROUND

Vacuum based aerosol collectors are used in some inkjet printers, for example higher volume color printers that generate large amounts of aerosol. Conventional vacuum based aerosol collectors use replaceable filters and a network of manifolds, hoses and ducts to connect the area near the source of the aerosol to the filter. During aerosol collection, not all of the ink particles in the aerosol drawn into the collector make it to the filter. In some printers, most of the ink particles are collected in ducts, hoses and manifolds, upstream of the filter. Over the life of the printer, these semi-permanent parts must sometimes be replaced, at significant expense, due to excess ink build-up that adversely affects the performance of the part.

BRIEF DESCRIPTION OF THE DRAWINGS

FIG. 8 is a perspective section view of the smaller, upstream intake duct in the aerosol collector shown in FIGS. 2-5 taken along the line 8-8 in FIG. 4.

FIG. 9 is a perspective section view of the larger, downstream intake duct in the aerosol collector shown in FIGS. 2-5 taken along the line 9-9 in FIG. 4.

FIG. 11 is a simplified perspective view of the duct shown in FIGS. 6 and 8.

The same or similar parts in the figures are identified by the same part numbers.

DESCRIPTION

Embodiments of the present disclosure were developed in an effort to improve the performance of the aerosol collector in an inkjet printer and to reduce the costs associated with servicing the aerosol collector. Thus, embodiments of the disclosure will be described with reference to an aerosol collector for an inkjet printer. Embodiments of the disclosure, however, are not limited to an aerosol collector for an inkjet printer but may be implemented in other aerosol collectors. The following description, therefore, should not be construed to limit the scope of the disclosure, which is defined in the claims that follow the description.

As used in this document: "aerosol" means a suspension of small liquid and/or solid particles in a gas; and a "uniform" rate of aerosol flow means the flow of aerosol does not vary by more than ±20%, as measured by the speed of aerosol flowing through the duct or as measured by the rate of aerosol particles accumulating in the duct.

Embodiments described herein use inertial separation to help collect larger aerosol particles in an intake duct so that only smaller particles pass through the duct to downstream components of the collector. Many of the smaller particles will travel all the way to the filter, thus reducing the unwanted collection of aerosol particles on the components between the intake duct and the filter, increasing the useful life of those components. The intake duct is configured to maintain a uniform rate of flow of aerosol through the duct (for a constant applied vacuum) even as aerosol particles accumulate within the duct so that the collecting capacity of the intake duct does not deteriorate significantly over a predetermined useful life of the duct. In addition, embodiments of the new intake duct are configured as replaceable parts that snap in and out without a lengthy service event.

FIG. 1 is a block diagram illustrating an aerosol collector 10 according to an embodiment of the disclosure. Referring to FIG. 1, aerosol collector 10 includes intake ducts 12, a manifold 14, a filter 16, secondary ducts 18, and a vacuum source 20. Intake ducts 12 are located near aerosol zones 22 containing aerosol 24. Aerosol 24 typically will include different sized particles, represented generally by smaller particles 26 and larger particles 28. For example, aerosol zones 22 may represent different regions of a print zone in an inkjet printer in which aerosol 24 represents tiny ink droplets suspended in air. Although three intake ducts 12 are shown near three aerosol zones 22, the number of ducts 12 and the number of zones 22 may vary depending on the particular environment or implementation for collector 10.

Aerosol 24 is drawn into intake ducts 12 by a pump or other suitable vacuum source 20. As described in detail below, intake ducts 12 are configured to function as the intake collection point for aerosol particles. As a practical matter, it is not possible in many environments (such as an inkjet printer) to collect all aerosol particles in intake ducts 12. Consequently, each intake duct 12 is configured to collect larger particles 28 while allowing smaller particles 26 to pass through to filter 16 through manifold 14 and secondary ducts 18. To minimize the unwanted collection of aerosol particles in manifold 14 and secondary ducts 18, it is desirable to collect in intake ducts 12 all aerosol particles that are not expected to pass through to filter 16. Thus, larger particles 28 represent those aerosol particles that are not expected to pass through to the filter 16 and, accordingly, smaller particles 26 represent those particles that are expected to pass through to the filter 16.

FIG. 2 is a perspective view illustrating one example embodiment of a portion of an inkjet printer 30 that includes an aerosol collector 10. Referring to FIG. 2, inkjet printer portion 30 includes a carriage 32 carrying three ink pens 34*a*, 34*b*, 34*c* and aerosol collector 10 mounted in a frame 36. In the embodiment shown in FIG. 2, carriage 32 is supported over a rotatable drum 38 that carries paper or another printable medium (not shown) past ink pens 34*a*-34*c*. Carriage 32 slides out, away from drum 38 to make pens 34*a*-34*c* and collector 10 more accessible, for example to facilitate servicing those components. Thus, frame 36 is fitted with a handle 40 for pulling carriage 32 out, away from drum 38.

Figure 3:
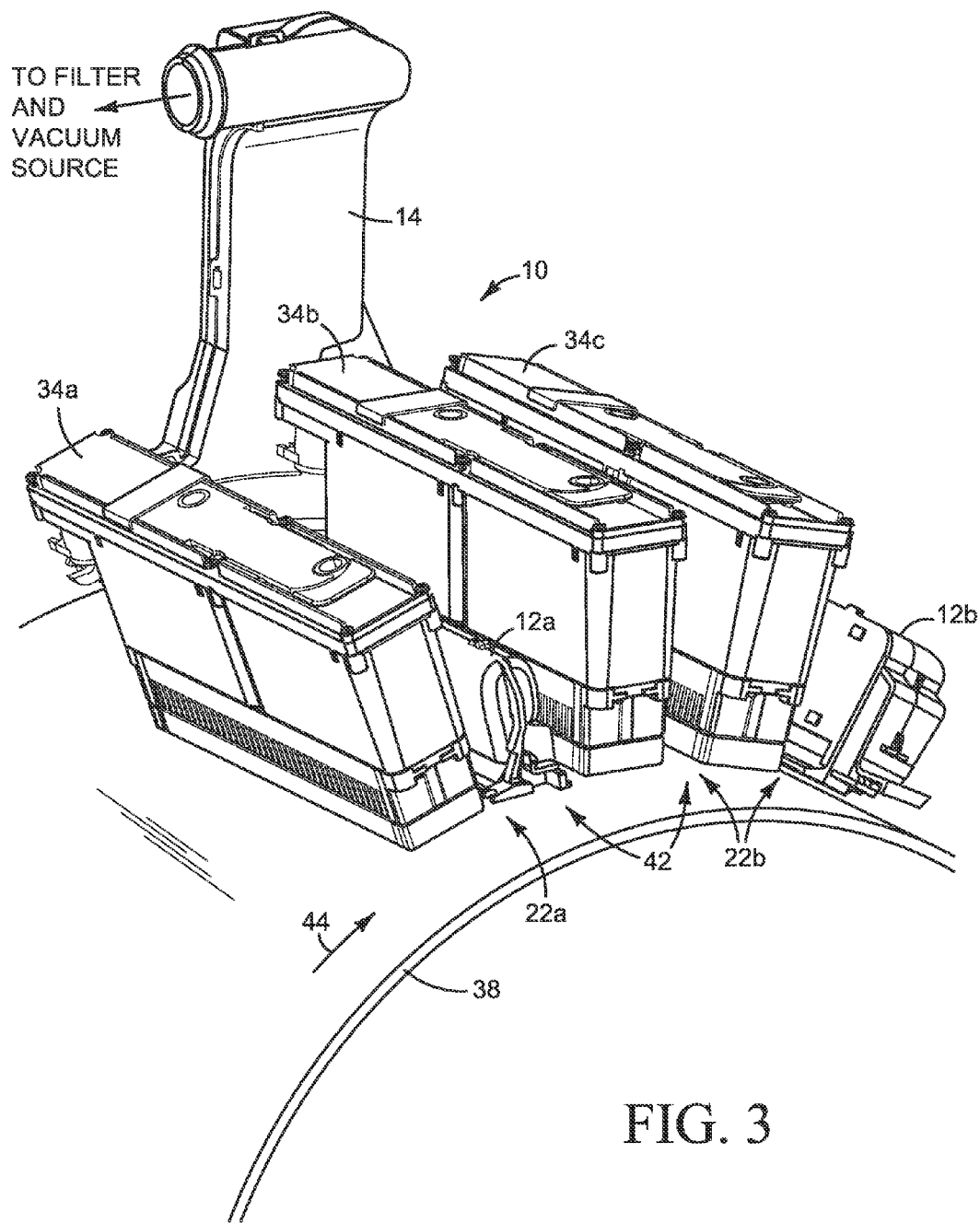
FIG. 3 is a perspective view of the inkjet printer portion of FIG. 2 with the frame removed to better illustrate the arrangement of the aerosol collector and the ink pens.
Figure 4:
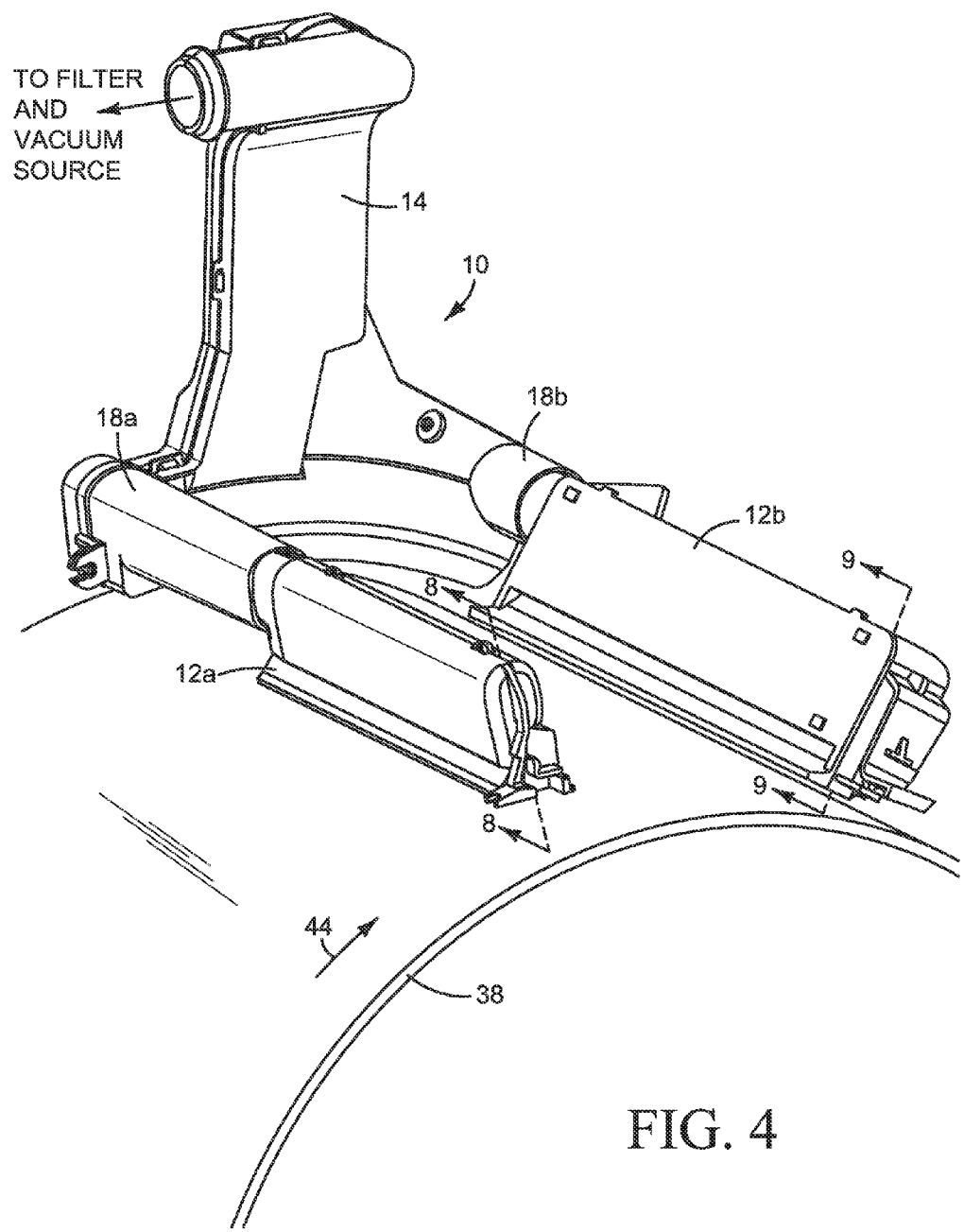
FIGS. 4 and 5 are perspective and elevation views, respectively, of the inkjet printer portion of FIG. 3 with the ink pens removed to better illustrate the aerosol collector.
Figure 5:
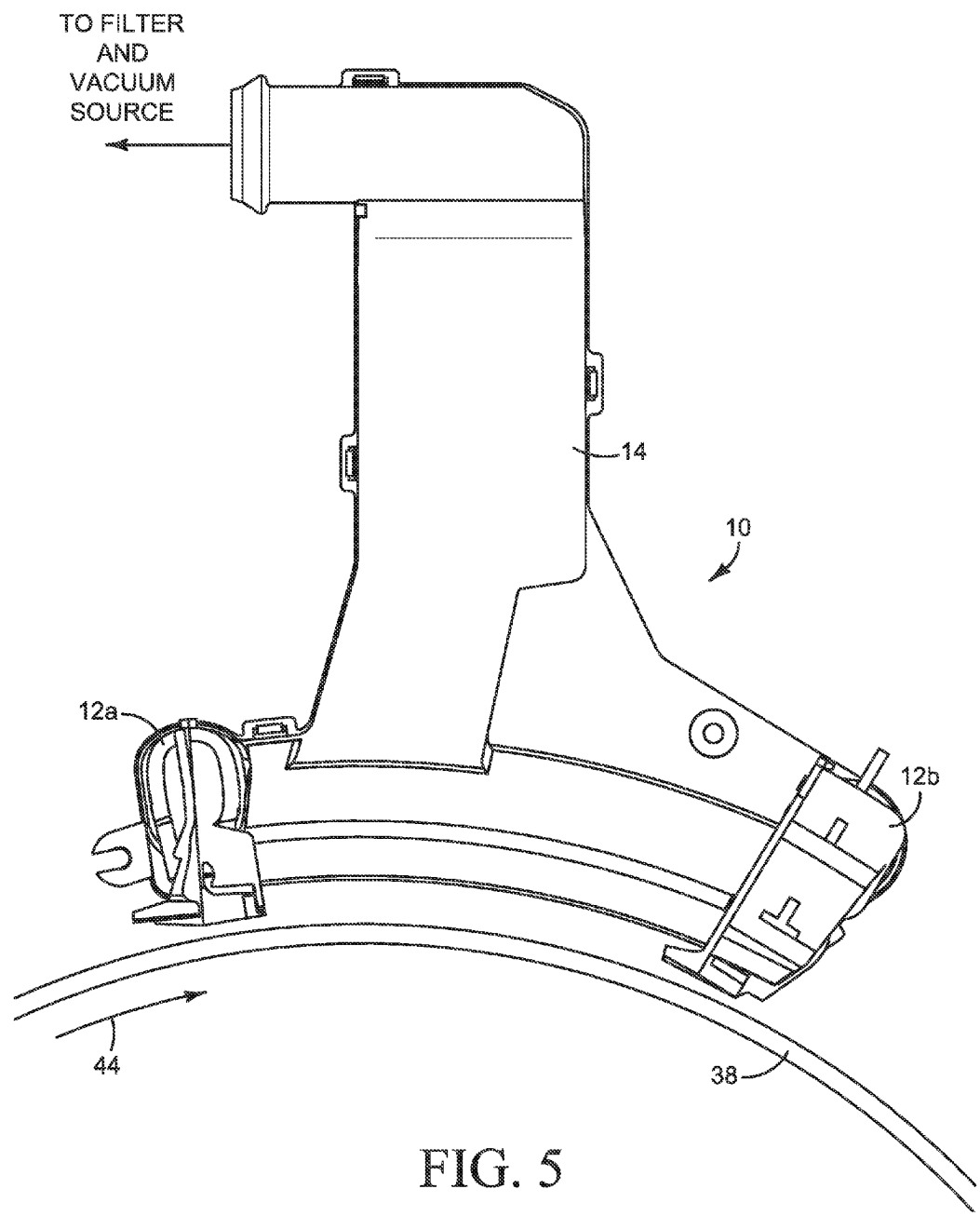

FIG. 3 is a perspective view of inkjet printer portion 30 with frame 36 removed to more clearly illustrate the arrangement of pens 34 and collector 10, along a print zone 42 in this example embodiment. In the perspective and elevation views of FIGS. 4 and 5, respectively, pens 34a-34c are also removed to better illustrate collector 10. The direction of rotation of drum 38 is indicated by arrow 44 in FIGS. 2-5. Referring now to FIGS. 2-5, collector 10 includes a first, upstream intake duct 12a located immediately downstream from ink pen 34a and a second intake duct 12b located immediately downstream from two ink pens 34b and 34c. Each intake duct 12a and 12b extends laterally across print zone 42. For this arrangement of intake ducts 12a, 12b and pens 34a-34c, print zone 42 may be characterized as having two aerosol zones—a first, upstream aerosol zone 22a and a second downstream aerosol zone 22b. Most of the aerosol in zone 22a will be generated by ink pen 34a and most of the aerosol in zone 22b will be generated by ink pens 34b and 34c. In general, and depending on the operation of pens 34a-34c, more aerosol will be generated in zone 22b from two pens 34b and 34c and less aerosol will be generated in zone 22a from a single pen 34a. Hence, intake duct 12b may have a greater aerosol particle collection capacity than intake duct 12a. Each intake duct 12a and 12b is connected to a manifold 14 through a secondary duct 18a and 18b, respectively.

Figure 6:
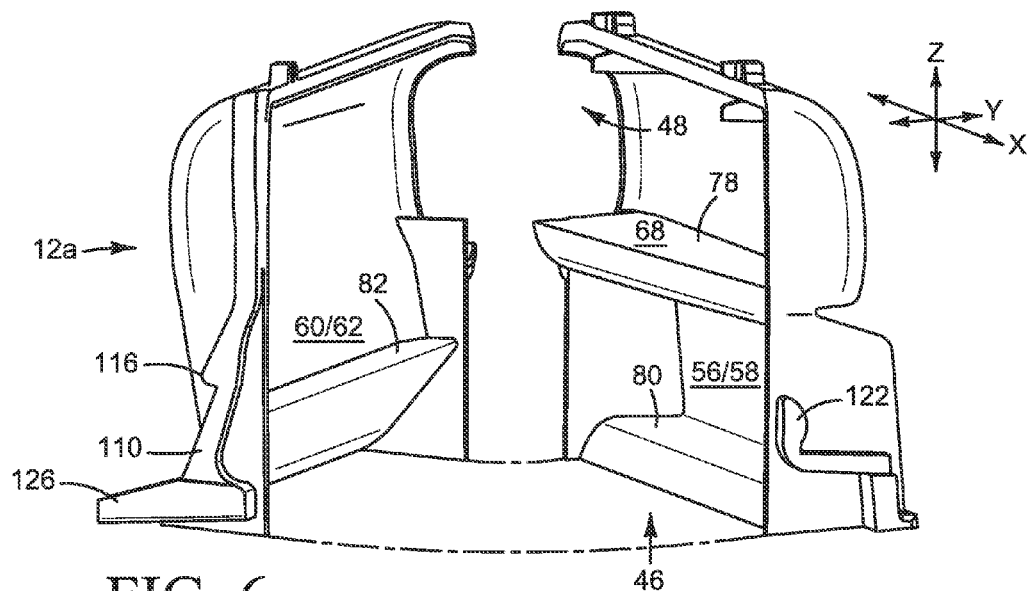
FIG. 6 is a perspective exploded view of the smaller, upstream intake duct in the aerosol collector shown in FIGS. 2-5.
Figure 7:
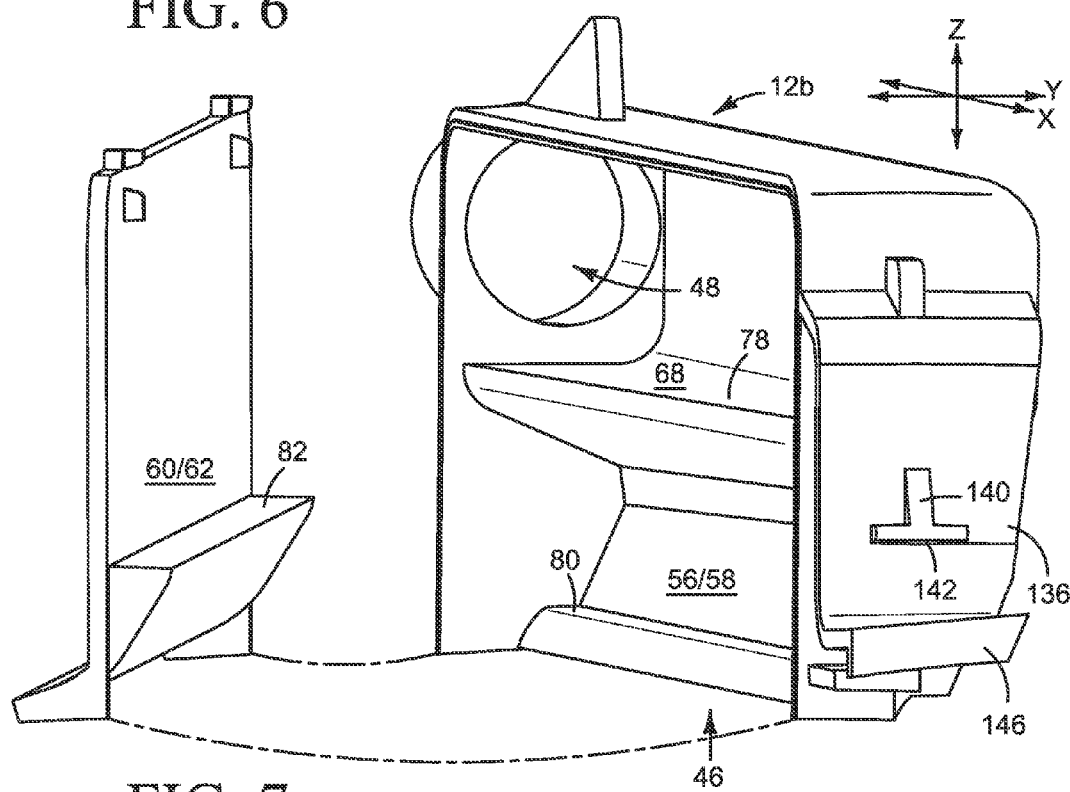
FIG. 7 is a perspective exploded view of the larger, downstream intake duct in the aerosol collector shown in FIGS. 2-5.

FIG. 6 is a perspective exploded view of the smaller intake duct 12a in the aerosol collector 10 shown in FIGS. 2-5. FIG. 7 is a perspective exploded view of the larger intake duct 12b in the aerosol collector 10 shown in FIGS. 2-5. FIG. 8 is a perspective section view of duct 12a taken along the line 8-8 in FIG. 4. FIG. 9 is a perspective section view of duct 12b taken along the line 9-9 in FIG. 4. Referring to FIGS. 6-9, each intake duct 12a, 12b includes an inlet 46 through which aerosol enters duct 12a, 12b and an outlet 48 through which aerosol leaves duct 12a, 12b. Aerosol flows through each duct 12a, 12b along a path 50 (FIGS. 8 and 9) from inlet 46 toward outlet 48. Inlet 46 is configured to guide the incoming flow of aerosol into a central chamber 52 in a first direction against a first baffle 56. The incoming flow of aerosol is deflected through a substantial angle, undergoing an abrupt change in direction, as it encounters first baffle 56. This abrupt change in direction slows the flow of aerosol so that some of the larger, heavier ink particles in the aerosol strike baffle 56 due to their greater inertia and collect at a primary collection area 58. Thus, a "substantial" angle in this regard means an angle sufficient under the flow conditions to prevent larger aerosol particles having greater inertia from making the turn (i.e., they are not deflected but rather strike the baffle).

The flow of aerosol continues through central chamber 52 in a second direction against a second baffle 60 where the flow is deflected through another substantial angle, undergoing another abrupt change in direction, as it encounters second baffle 60. Again, the abrupt change in direction slows the flow of aerosol so that more of the larger, heavier ink particles in the aerosol strike second baffle 60 and collect at a secondary collection area 62. In the embodiment shown, first baffle 56 and second baffle 60 are formed by the outer wall 64 of duct 12a, 12b.

The aerosol flow continues past second baffle 60 into a downstream chamber 66 where the flow circulates as it approaches outlet 48. Thus, downstream chamber 66 may also be referred to as a vortex chamber 66. The circulating flow through vortex chamber 66 forces larger aerosol particles toward the outer perimeter of vortex chamber 66. The flow rate of aerosol 24 through vortex chamber 66 is established so that the combined effects of the centrifugal and gravitational forces acting on the aerosol particles deposits the larger particles primarily at a tertiary collection are 68.

Figure 1:
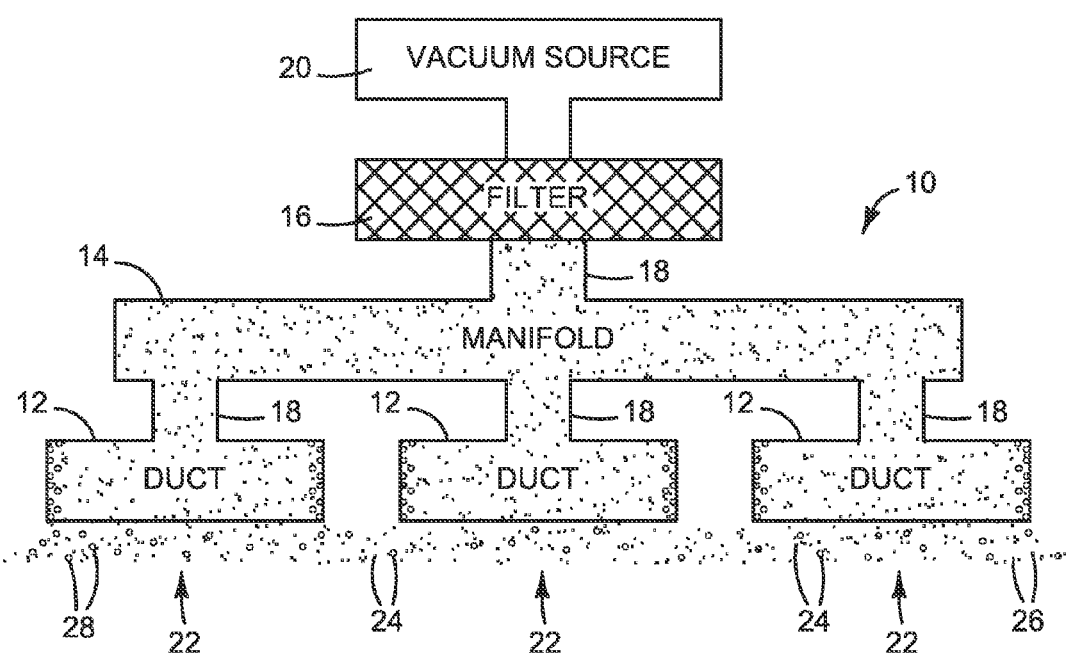
FIG. 1 is a block diagram illustrating an aerosol collector according to an embodiment of the disclosure.
Figure 2:
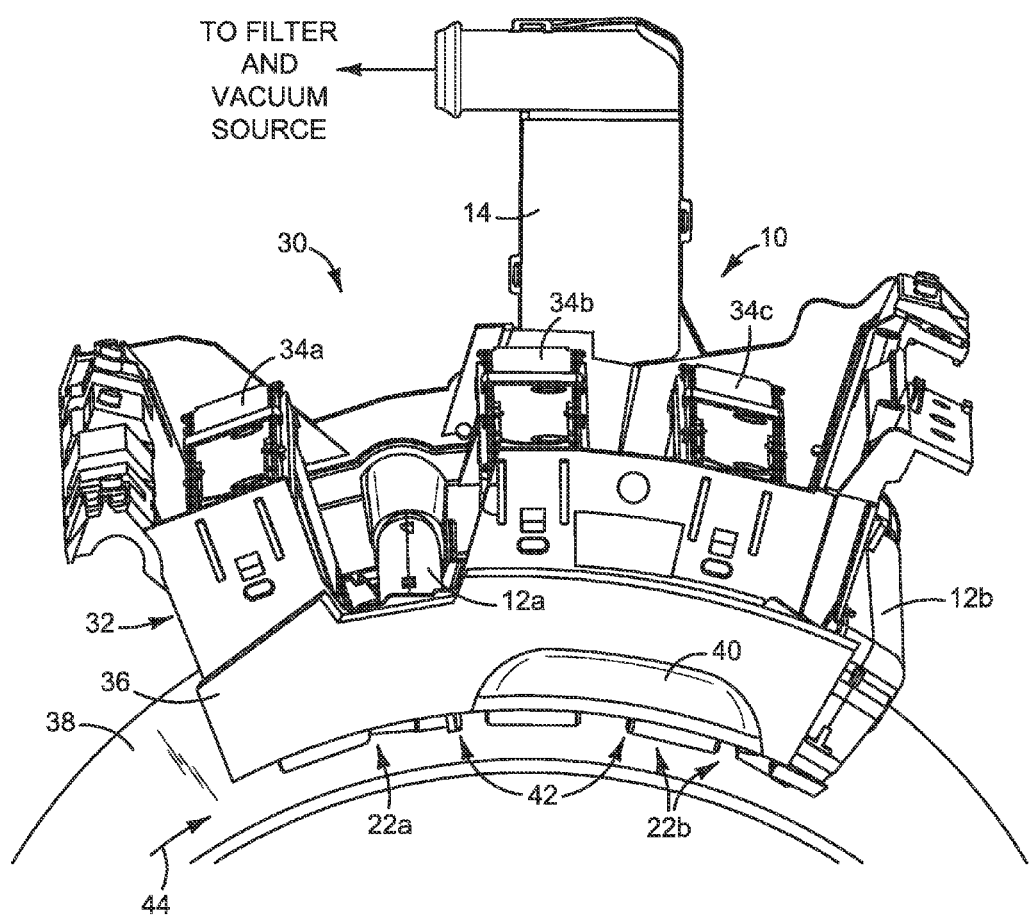
FIG. 2 is a perspective view illustrating a portion of an inkjet printer that includes an aerosol collector according to an embodiment of the disclosure.
Figure 10:
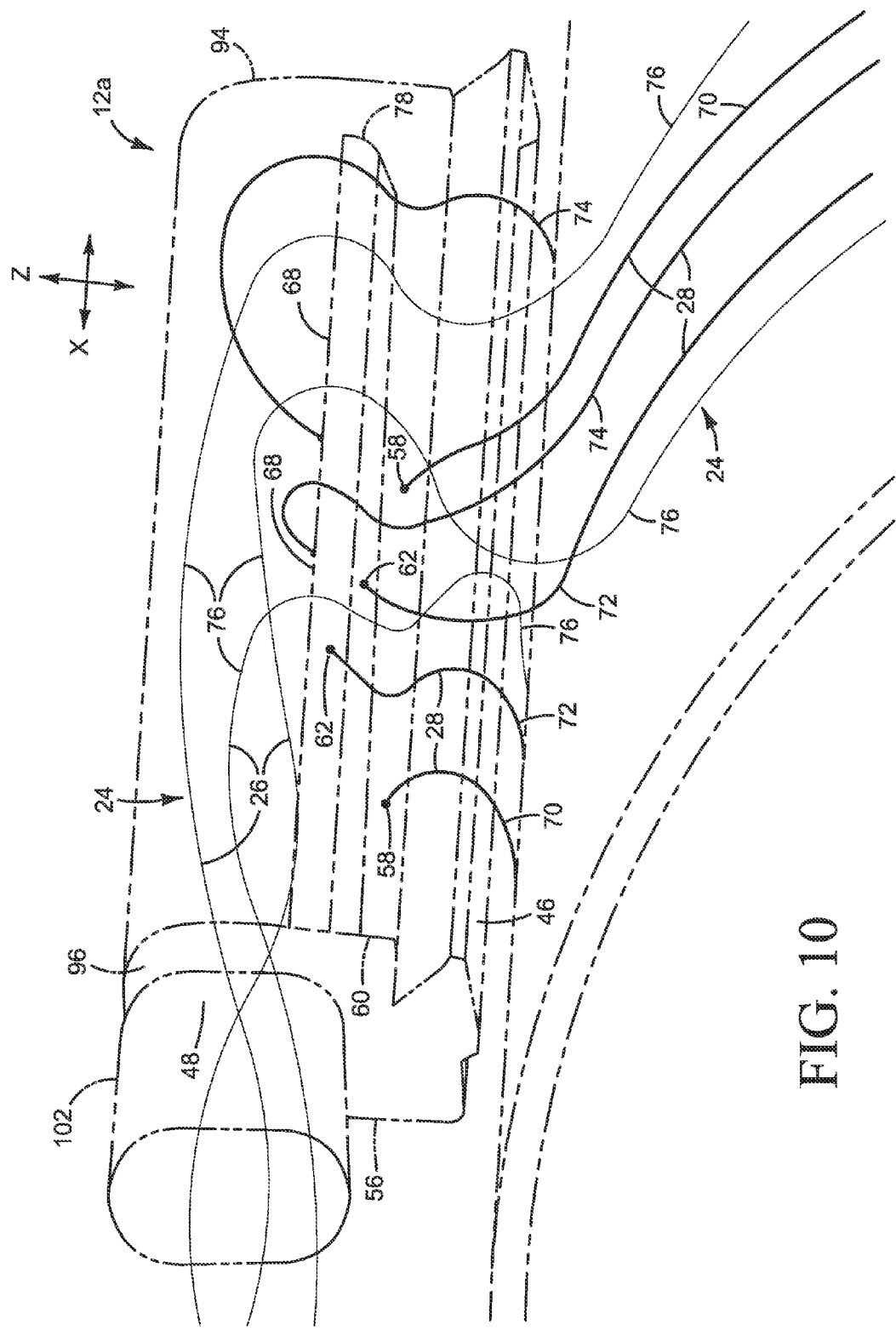
FIG. 10 is a perspective view illustrating the flow of aerosol through the duct shown in FIGS. 6 and 8.

The flow of aerosol 24 through duct 12a is illustrated more fully in FIG. 10. In FIG. 10, the structures are shown in phantom lines and the flow of aerosol 24 is depicted with lighter weight solid lines indicating the flow of lighter particles 26 and heavier weight lines indicating the flow of larger particles 28. Referring to FIG. 10, as described above, the incoming flow of aerosol 24 slows as it encounters first baffle 56 so that some of the larger, heavier ink particles 28 strike baffle 56 and collect at primary collection area 58. The collection of larger particles 28 at area 58 is indicated by flow lines 70 in FIG. 10. The flow of aerosol 24 is then guided through central chamber 52 against second baffle 60 where it undergoes another abrupt change in direction and slows so that more of the larger, heavier ink particles 28 strike second baffle 60 and collect at secondary collection area 62. The collection of larger particles at area 62 is indicated by flow lines 72 in FIG. 10. Then the aerosol flows into vortex chamber 66 where still more of the larger particles 28 are deposited at a tertiary collection are 68. The collection of larger particles at area 68 is indicated by flow lines 74 in FIG. 10. The remaining flow of aerosol 24, containing smaller particles 26 and few if any larger particles 28, then flows through outlet 48 into a secondary duct 18 and on to manifold 14 (FIGS. 1-5) and filter 16 (FIG. 1). The flow of smaller particles 26 through outlet 48 is indicated by flow lines 76 in FIG. 10.

Referring now to all of FIGS. 6-10, the flow of aerosol through ducts 12a, 12b is restricted, by design, at outlet 48. Particle collection areas 58, 62 and 68 are located sufficiently far away from areas within duct 12a, 12b that could restrict the overall flow so that the collection of aerosol particles at areas 58, 62 and 68 will not create unwanted flow restrictions through ducts 12a and 12b. Thus, as aerosol particles are removed from the aerosol at baffles 56, 60 and along ledge 78, aerosol will continue to flow through duct 12a, 12b unimpeded by particles stored at collection areas 58, 62 and 68 and, accordingly, the capacity of duct 12a, 12b for accumulating aerosol particles remains unchanged. That is to say, the rate of aerosol flow remains uniform, as measured by the rate of aerosol particle accumulation or as measured by the speed of aerosol flowing through duct 12a, 12b, even as particles accumulate at collection areas 58, 62 and 68. As noted above, "uniform" in this context means±20%. Testing suggests that flow variations up to ±20% are sufficient to support adequate particle collection within the duct.

It is desirable to maintain a uniform velocity profile for aerosol flow along the length of duct 12a, 12b. That is to say, aerosol should be drawn in to duct 12a, 12b at about the same rate at the distal end 94 of the duct, away from outlet 48, as it is at the proximal end 96 of the duct, closer to outlet 48. In a conventional aerosol collector for an inkjet printer, vanes are used within the intake duct to distribute the flow of aerosol uniformly along the duct. These vanes, however, act as unwanted collection points for aerosol particles and the flow rate of aerosol through the duct deteriorates as aerosol particles collect on the vanes. In intake duct 12a, 12b, by contrast, a tapered opening 84 is used to maintain a uniform velocity profile for aerosol flow along the length of duct 12a, 12b. This configuration for opening 84 helps maintain a uniform velocity profile along the length of duct 12a, 12b without also creating the unwanted accumulation of aerosol particles in areas that could restrict overall flow through the duct. A uniform velocity profile refers to a uniform rate of aerosol flow as measured by the speed of aerosol flowing through opening 84 along the length of duct 12a, 12b. As noted above, "uniform" in this context means±20%. Testing suggests that flow variation along duct 12a, 12b up to ±20% is sufficient to support adequate particle collection within the duct. Thus, although it may be possible to achieve greater uniformity, the added cost and complexity of achieving greater uniformity may not be justified in all implementations.

Figure 11:
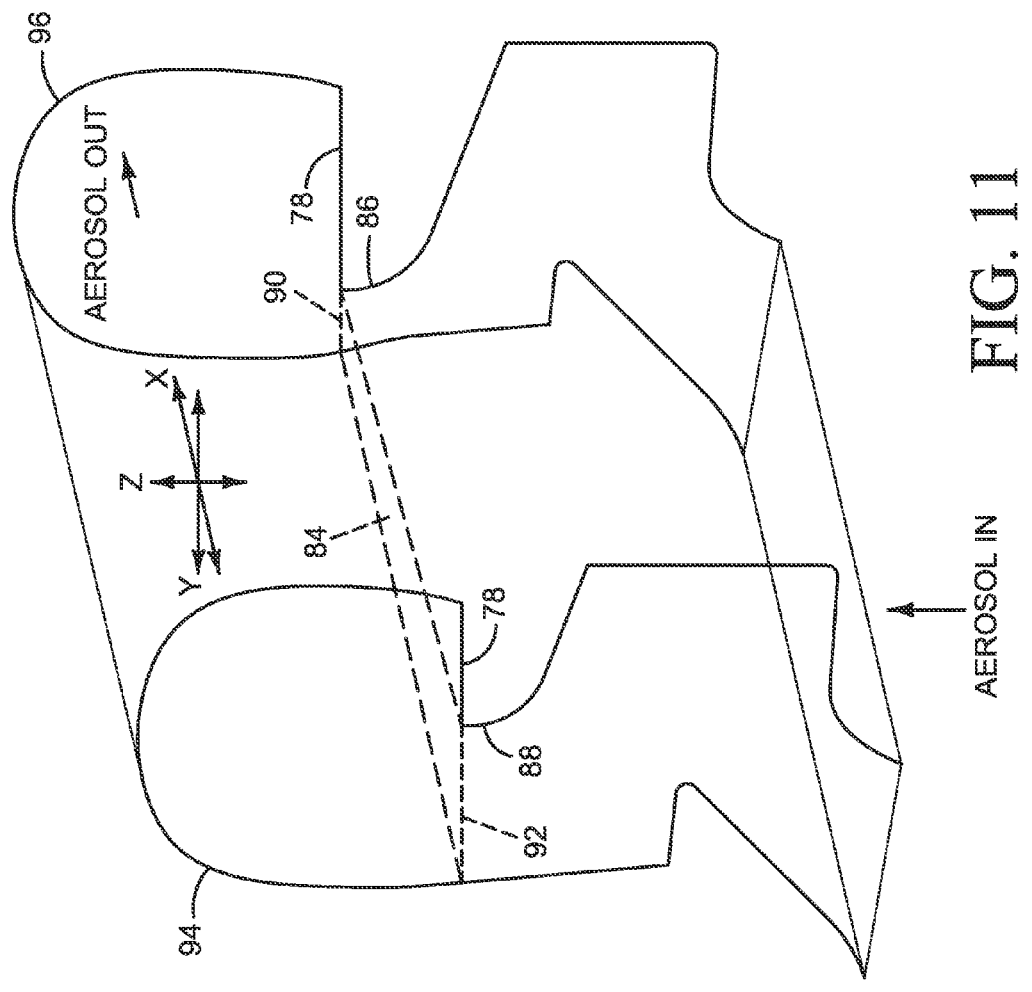
Figure 13:
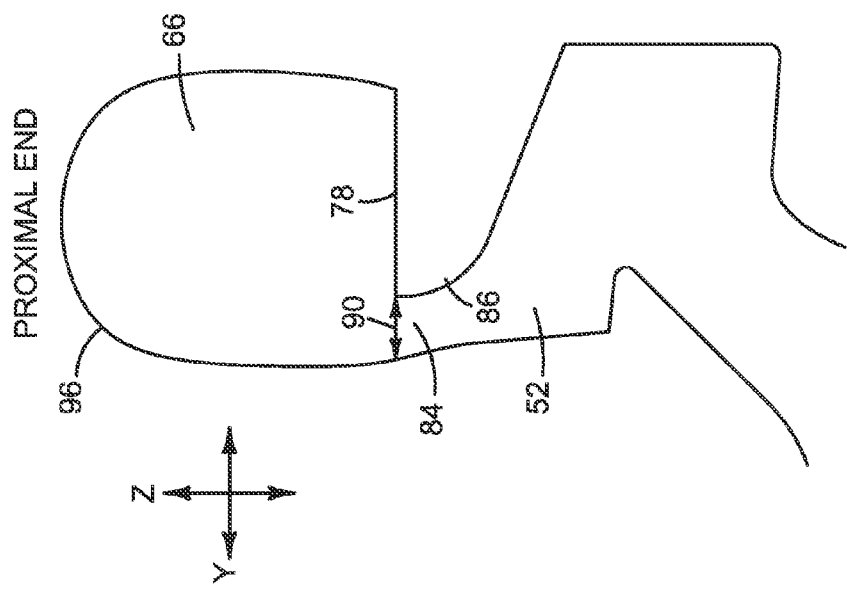
FIGS. 12 and 13 are simplified elevation views of the distal and proximal ends, respectively, of the duct shown in FIGS. 6 and 8.
Figure 12:
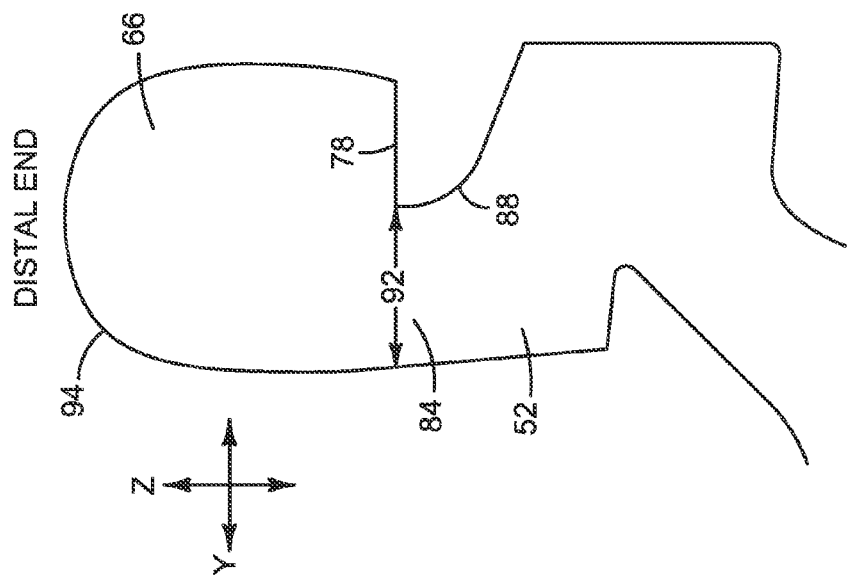

Reference will also be made now to FIGS. 11-13. FIG. 11 is a simplified perspective view of duct 12a. FIGS. 12 and 13 are simplified elevation views of duct 12a at distal and proximal ends 94 and 96, respectively. Referring to FIGS. 6-13, elongated opening 84 is shaped by tapered ledge 78. Ledge 78 protrudes into the interior of duct 12a, 12b to define upstream/central chamber 52 and downstream/vortex chamber 66. Ledge 78 tapers from a wider part 86 at proximal end 96 near outlet 48 to a narrower part 88 at distal end 94 away from outlet 48. Accordingly, opening 84 tapers from a wider, less restrictive part 92 at distal end 94 away from outlet 48 to a narrower, more restrictive part 90 at proximal end 96 near outlet 48. Thus, the flow of aerosol through opening 84 is most restricted at narrower part 90 where the pressure difference between inlet 46 and outlet 48 is greatest. The flow of aerosol becomes gradually less restricted moving out along opening 84. The flow through opening 84 is least restricted at wider part 92 where the pressure difference between inlet 46 and outlet 48 is smallest.

In one example embodiment for duct 12a, inlet 46 has a planar area of about 11.5 cm$^2$ (e.g., 11.5 cm long×1 cm wide), outlet 48 has a planar area of about 1.3 cm$^2$ and opening 84 has a planar area of about 5.6 cm$^2$ (e.g., 11.5 cm long×0.7 cm at the broad end and 0.3 cm at the narrow end). Vacuum is supplied to duct 12a, 12b sufficient to draw aerosol into inlet 46 at a speed of 320 ft/minute±32 ft/minute with a pressure drop of about 3.7 inches of water across duct 12a, 12b (from inlet 46 to outlet 48). Under these conditions, the duct geometry delivers an aerosol flow of about 6 cfm (cubic feet per minute). For the example configuration, modeling indicates that 100% of aerosol particles larger than 15 μm are trapped in duct 12a, 12b at collection areas 58, 62 and 68 while 100% of aerosol particles smaller than 10 μm pass through duct 12a, 12b. Aerosol particles smaller than 10 μm may be effectively filtered along with a small percentage of 10-15 μm particles at 6 cfm throughout a predetermined useful life of duct 12a, 12b of 300,000-500,000 4 inch×6 inch color photograph prints, or its equivalent.

Figure 14:
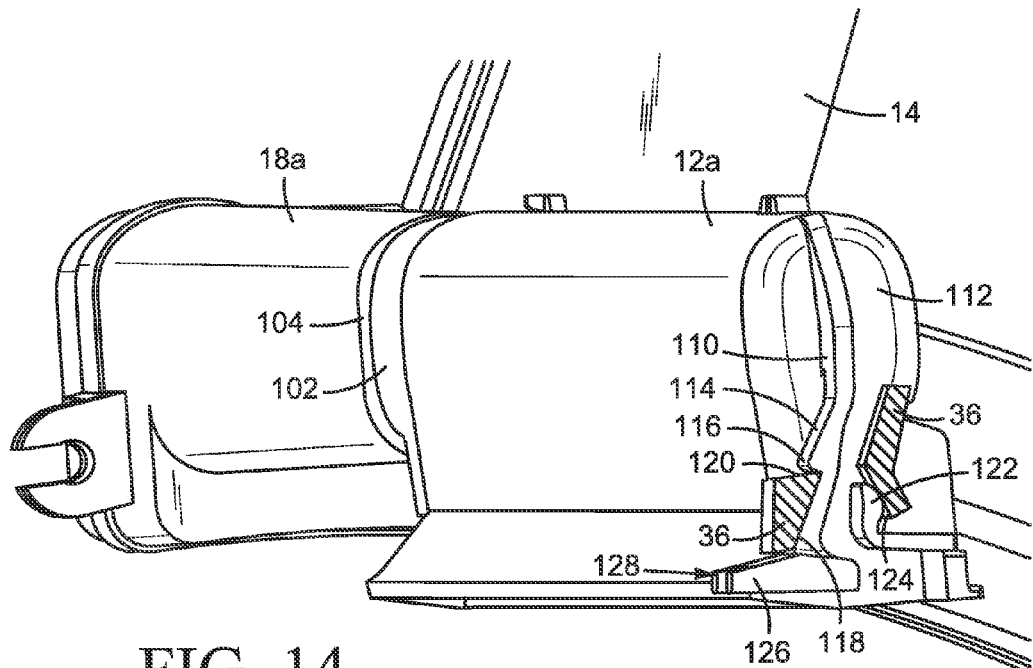
FIGS. 14-17 are detail views illustrating one example embodiment of a replaceable intake duct that snaps in and out of the aerosol collector for easy replacement.
Figure 15:
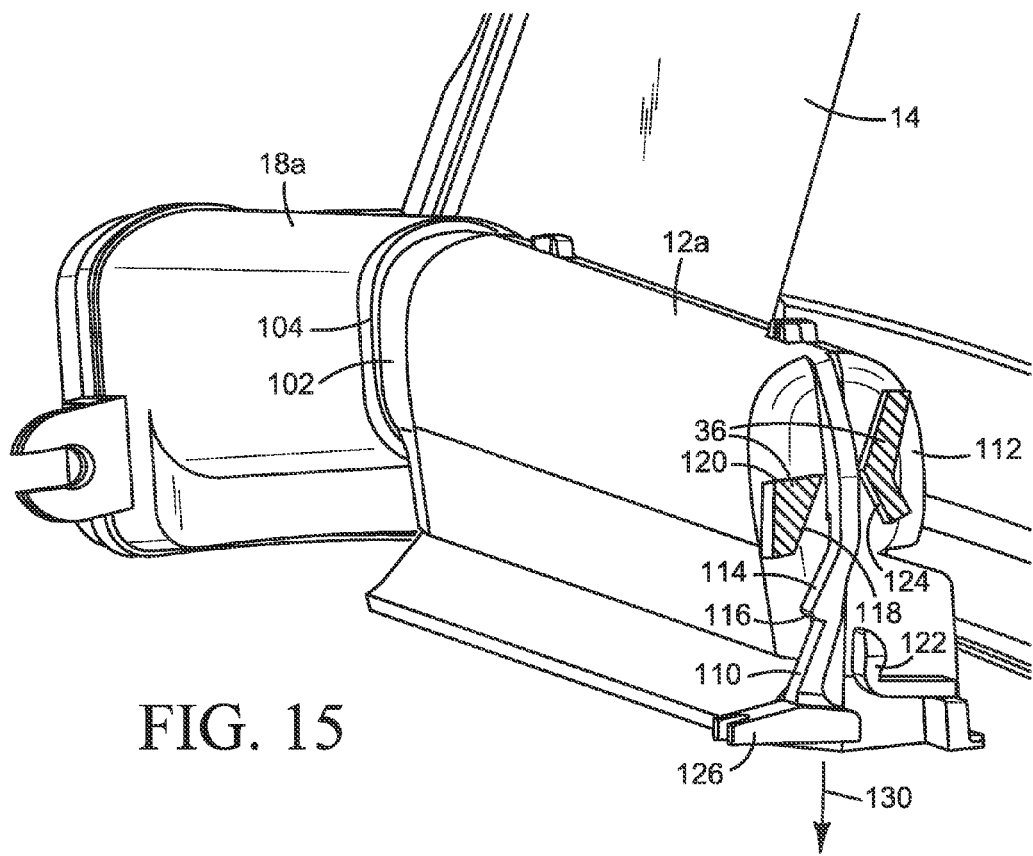
Figure 16:
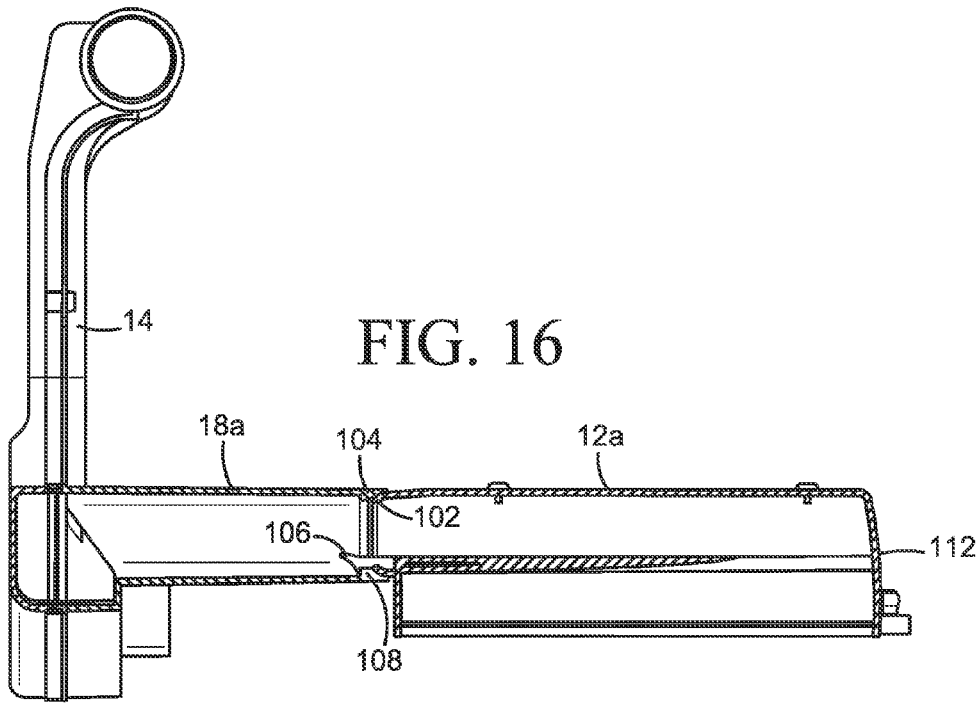
Figure 17:
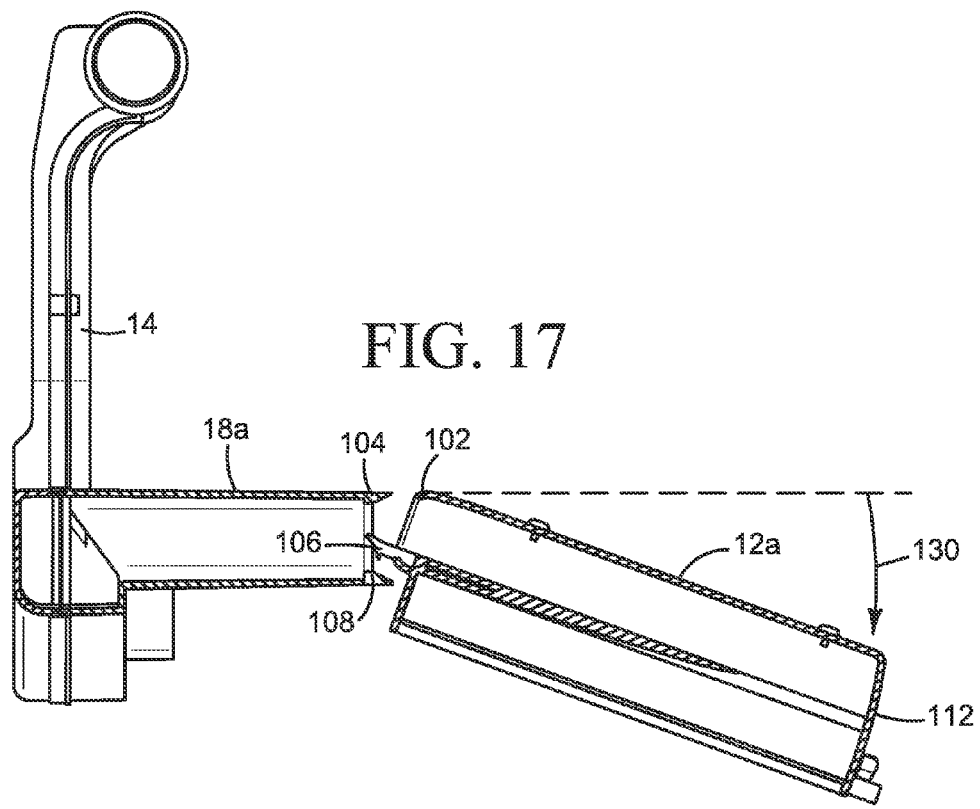

FIGS. 14-17 and FIGS. 18-19 illustrate two example embodiments of a replaceable intake duct (duct 12a and 12b, respectively) that snaps in and out of collector 10 for easy replacement. Referring first to the example embodiment shown in FIGS. 14-17, intake duct 12a includes a short nipple 102 at outlet 48 that fits into the inlet end 104 of secondary duct 18a. Referring specifically to FIGS. 16 and 17, a barbed projection 106 on the bottom of nipple 102 hooks over a step 108 in the end of secondary duct 18a to help secure the end of nipple 102 in the inlet end 104 of secondary duct 18a. Referring now specifically to FIGS. 14 and 15, a hinged tab 110 at the distal end 94 of intake duct 12a snaps into frame 36 to secure duct 12a in the installed position shown in FIGS. 14 and 16. Only that part of frame 36 interfacing with tab 110 is shown in FIGS. 14 and 15. In the embodiment shown, tab 110 is itself formed as a "living" hinge that flexes along its length. A beveled guide surface 114 on tab 110 leads to a barb 116. A mating beveled, rigid, guide surface 118 on frame 36 leads to a step 120. Tab guide surface 114 bears against frame guide surface 118 as tab 110 is pushed up and in to frame 36, flexing tab 110, until barb 116 snaps into position on step 120, as best seen by comparing FIGS. 15 and 14. A secondary positioning tab 122 on duct 12a bears against a stop 124 on frame 36 to help position duct 12a correctly against frame 36. Duct 12a is easily removed by: (1) pushing laterally on the foot 126 of tab 110, as indicated by direction arrow 128 in FIG. 14, to release barb 116 from step 120; and (2) dropping the end 94 of duct 12a down away from frame 36, as indicated by direction arrows 130 in FIGS. 15 and 17, to release nipple barb 106 from secondary duct 18a.

Figure 18:
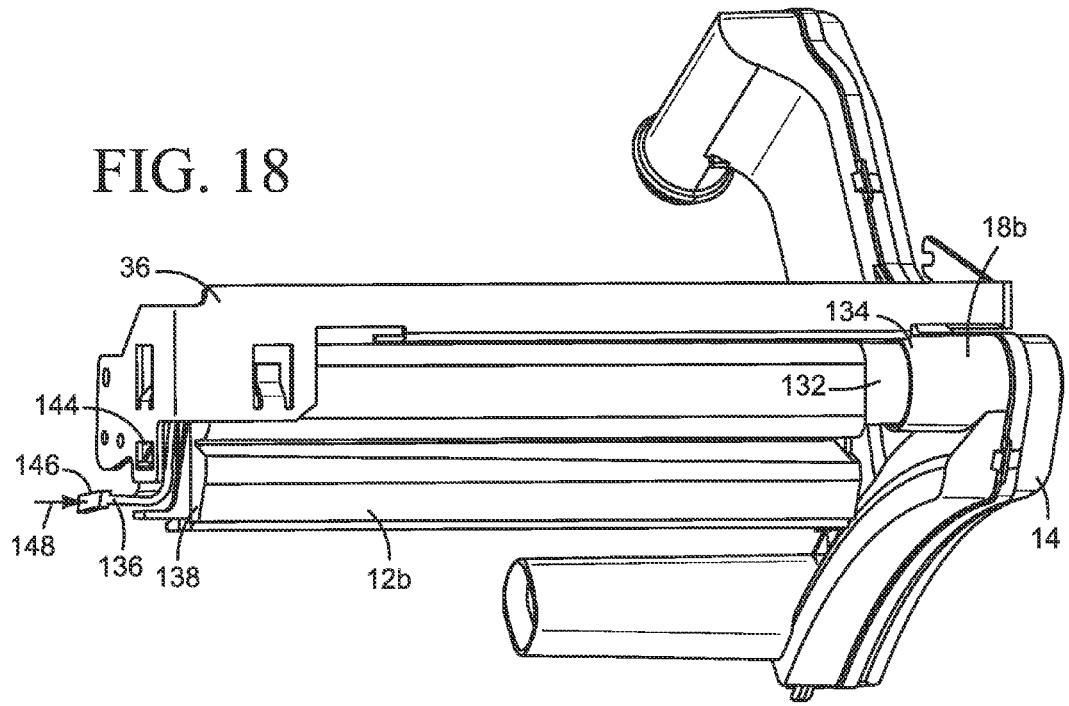
FIGS. 18 and 19 are detail views illustrating a second example embodiment of a replaceable intake duct that snaps in and out of the aerosol collector for easy replacement.
Figure 19:
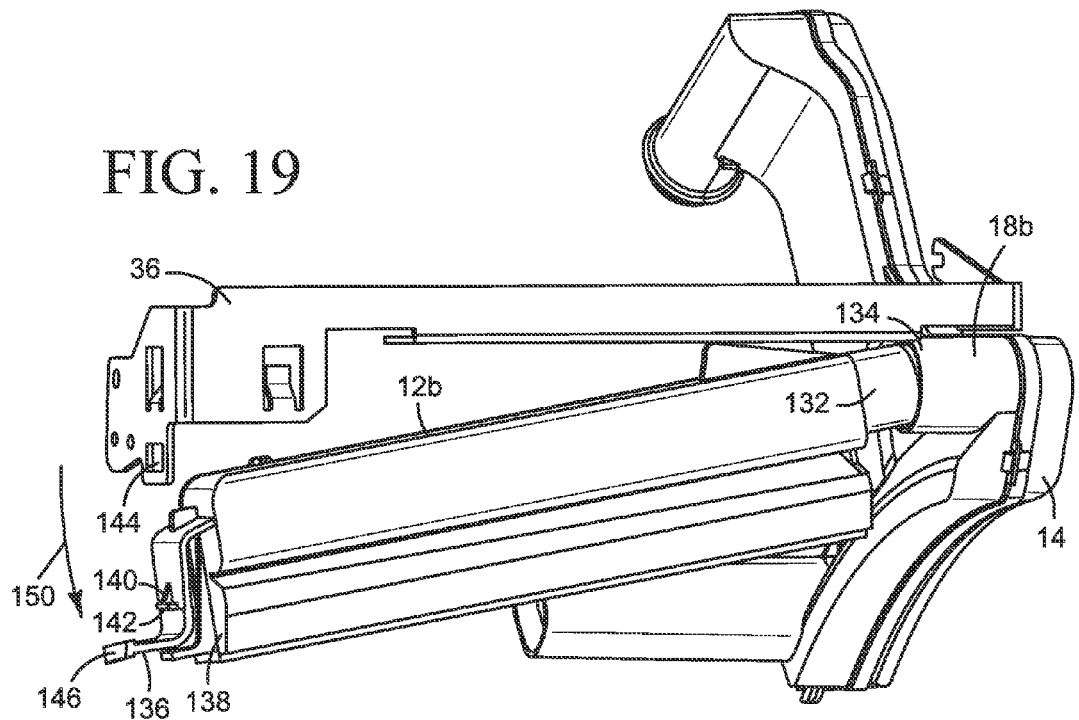

Referring now to the example embodiment shown in FIGS. 18 and 19, intake duct 12b includes a short nipple 132 at outlet 48 that fits into the inlet 134 to secondary duct 18b. A hinged tab 136 at the distal end 94 of intake duct 12b snaps into frame 36 to secure duct 12b in the installed position shown in FIG. 18. Tab 136 is itself formed as a "living" hinge that flexes along its length. A beveled guide surface 140 on tab 136 leads to a barb 142. Beveled surface 140 bears against frame 36 as tab 136 is pushed up and in to frame 36, flexing tab 136, until barb 142 snaps into an opening 144 in frame 36, as best seen by comparing FIGS. 19 and 18. Duct 12b is easily removed by: (1) pushing in on the foot 146 of tab 136, as indicated by direction arrow 148 in FIG. 18, to release barb 136 from frame 36; and (2) dropping the end 94 of duct 12b down away from frame 36, as indicated by direction arrow 150 in FIG. 19, to release duct nipple 132 from manifold 14.

As noted at the beginning of this Description, the exemplary embodiments shown in the figures and described above illustrate but do not limit the disclosure. Other forms, details, and embodiments may be made and implemented. Therefore, the foregoing description should not be construed to limit the scope of the disclosure, which is defined in the following claims.

What is claimed is:

1. An aerosol particle collector, comprising a duct having an elongated inlet extending along a length of the duct through which aerosol may enter the duct and an outlet located at one end of the length of the duct through which aerosol may exit the duct, the duct defining a flow path therethrough from the inlet toward the outlet and the flow path configured to: remove larger particles from aerosol flowing through the duct and store the removed particles in the duct; and maintain a uniform rate of aerosol flow through the duct throughout a predetermined useful life of the duct even as stored aerosol particles accumulate in the duct; and wherein the flow path includes an opening extending along the length of the duct, the opening configured to restrict the flow of aerosol from the inlet to the outlet and to maintain a uniform rate of flow of aerosol through the opening along the length of the duct.

2. The collector of claim 1, wherein the flow path is defined at least in part by a first baffle configured to deflect aerosol flowing in a first direction from the inlet to a second direction such that larger particles in the aerosol collect on the first baffle.

3. The collector of claim 2, wherein the flow path is further defined at least in part by a second baffle configured to deflect aerosol flowing in the second direction to a third direction such that larger particles in the aerosol collect on the second baffle.

4. The collector of claim 1, wherein the opening varies from a less restrictive part of the opening at a distal end away from the outlet to a more restrictive part of the opening at a proximal end near the outlet.

5. The collector of claim 4, wherein the opening tapers from a wider, less restrictive part of the opening at the distal end to a narrower, more restrictive part of the opening at the proximal end.

6. An aerosol particle collector, comprising:
a first duct having an elongated inlet through which aerosol may enter the first duct, the inlet extending along a length of the first duct, and an outlet through which aerosol may exit the first duct, the outlet located at one end of the length of the first duct;
a plurality of elongated baffles in the first duct, a first one of the baffles extending along a first side of the first duct for deflecting incoming aerosol toward a second side of the first duct opposite the first side, and a second one of the baffles for deflecting aerosol toward the outlet.

7. The collector of claim 6, wherein each baffle is positioned in the first duct such that aerosol particles accumulating on the baffles will not restrict the flow of aerosol through the first duct throughout a predetermined useful life of the first duct.

8. The collector of claim 7, wherein the plurality of elongated baffles comprises exactly two elongated baffles and the second baffle extends along a second side of the first duct opposite the first side for deflecting aerosol deflected off the first baffle toward the outlet.

9. The collector of claim 6, further comprising an elongated ledge extending along one side of the first duct;
the ledge protruding into the first duct to define an upstream chamber in the first duct adjacent to the inlet, a downstream chamber in the first duct adjacent to the outlet, and an opening between the upstream chamber and the downstream chamber; and
the ledge tapering along the length of the first duct: from a wider part of the ledge near the outlet, the wider part of the ledge defining a more restrictive part of the opening near the outlet; to a narrower part of ledge away from the outlet, the narrower part of the ledge defining a less restrictive part of the opening away from the outlet.

10. The collector of claim 6, further comprising:
a second duct;
a frame;
the outlet end of the first duct supported in an inlet end of the second duct; and
a distal end of the first duct opposite the outlet end detachably secured to the frame.

11. The collector of claim 10, wherein the second duct comprises a manifold or an inlet to a manifold, and the first duct has a hinged tab configured to snap into the frame to detachably secure the first duct to the frame.

12. A method for collecting aerosol particles, comprising:
ducting aerosol from an inlet to an outlet; and while ducting the aerosol, removing first particles of greater inertia from the aerosol at a first location and storing the first particles at the first location without restricting the flow of aerosol from the inlet to the outlet; and while ducting the aerosol, circulating aerosol along a ledge to remove second particles of greater inertia from the aerosol onto the ledge without restricting the flow of aerosol from the inlet to the outlet.

13. The method of claim 12, further comprising, while ducting the aerosol, removing second particles of greater inertia from the aerosol at a second location downstream from the first location and storing the second particles at the second location without restricting the flow of aerosol from the inlet to the outlet.

14. The method of claim 13, wherein:
removing and storing the first particles comprises deflecting the flow of aerosol through a first substantial angle; and
removing and storing the second particles comprises deflecting the flow of aerosol through a second substantial angle.

* * * * *